United States Patent [19]

Day

[11] 4,201,501
[45] May 6, 1980

[54] CUTTING TOOL

[76] Inventor: Flory M. Day, 4893 W. 210 St., Fairview Park, Ohio 44126

[21] Appl. No.: 960,008

[22] Filed: Nov. 13, 1978

Related U.S. Application Data

[63] Continuation of Ser. No. 810,318, Jun. 27, 1977, abandoned.

[51] Int. Cl.$^2$ .......................... B26D 1/00; B26D 1/12
[52] U.S. Cl. .......................................... 407/92; 407/3; 407/100; 407/118; 407/119
[58] Field of Search ................... 407/2, 3, 73, 74, 75, 407/76, 77, 78, 92, 102, 103, 118, 119, 85, 86, 87, 93, 94, 95, 96, 97, 100

[56] References Cited

U.S. PATENT DOCUMENTS

| 2,587,179 | 2/1952 | Leveille | 407/92 |
| 2,908,963 | 10/1959 | Gollus | 407/76 |
| 3,253,322 | 5/1966 | Christian | 407/78 |
| 3,289,273 | 12/1966 | Artaud | 407/118 |

FOREIGN PATENT DOCUMENTS

| 301512 | 9/1954 | Switzerland | 29/95 |
| 222121 | 2/1968 | U.S.S.R. | 29/96 |

*Primary Examiner*—Harrison L. Hinson
*Attorney, Agent, or Firm*—Watts, Hoffmann, Fisher & Heinke Co.

[57] ABSTRACT

A cutting tool with a holder and a removable insert that has a flat positioning surface and a cutting edge located in the plane of said surface. The insert is carried in a slot of the holder, with the positioning surface of the insert clamped against a locating surface of the holder that in part forms the slot. The locating surface of the holder orients and locates the insert and, hence, the cutting edge in a plane that remains unchanged after the cutting edge is sharpened by grinding and lapping the positioning surface of the insert. Where the cutting edge is formed in a tip or bit of diamond or other cutting material different from the insert, the tip or bit need not be removed from the insert and reset for grinding or lapping. In use, the insert is clamped to the holder intermediate its ends and contact with the locating surface is restricted to spaced areas on opposite sides of a clamping screw. Longitudinal adjustment of the insert relative to the holder is afforded by an elongated slot in the insert, through which the clamping screw extends.

3 Claims, 6 Drawing Figures

CUTTING TOOL

This is a continuation of application Ser. No. 810,318 filed June 27, 1977 now abandoned.

BACKGROUND OF THE INVENTION

1. Field of the Invention

This invention relates to cutting tools and more particularly to a cutting tool with a removable insert.

2. Prior Art

It is common practice to provide cutting tools with a bit or tip of hard material, such as diamond, tungsten carbide, ceramic, or the like. The tip or bit is brazed or otherwise secured to the end of the tool shank or onto a replaceably mounted insert securable to a tool holder.

In manufacturing a typical cutting tool having a bit or tip of hard material, for example, a diamond-tip tool, a rough uncut diamond is set in a dop or metal slug with a brazing torch, and a rough lapping operation is performed. A fine-finish grinding or lapping operation is then performed and the diamond is again heated to remove it from the dop. It is then set in a tool shank or permanent holder with a solder (usually silver) by the application of heat, e.g., from a brazing torch. The tool shank is then either ground or placed on a belt sander to clean the excess flux and solder. Each of these steps subjects the tool and tip to substantial heat-induced stresses.

When a tool of the above type requires sharpening, the practice has been to remove the diamond, by the application of heat, for examination. The diamond is then mounted in a brass holder, by brazing, and the side contours are lapped. The diamond is then demounted from the brass holder by the application of heat and secured to a dop. It is either mechanically held in the dop or may be held in lead, which requires less heat than used in brazing. The cutting surface, sometimes called "the table" is then lapped. The diamond is again mounted in its permanent holder or tool shank, by brazing. The mounted diamond and holder are then cleaned to remove excess brazing compound, a step that involves substantial care to avoid damage to the diamond.

It will be apparent from the above that the typical procedures require skillful operations that are time consuming and, hence, expensive to perform, and subject the cutting tool and diamond tip to a great many heating steps, which are deleterious to the diamond or other tip material that may be used.

One approach that has been adopted, in an attempt to avoid some of the problems with tools of the aforementioned type, has been to mount bits in supports or inserts that are removable. Where the bit and insert are inexpensive, the insert and used bit can be discarded. Where the bit is expensive, the insert and bit can be removed as a unit and resharpened. The discarding of bits and inserts is of course wasteful and yet the resharpening of bits has not been satisfactory because of the need for accurate readjustment of the insert in the holder and/or readjustment of the holder in the machine tool after sharpening of the bit, to accommodate the change in the location of the cutting surface or edge. For example, the sharpening of bits or inserts of known cutting tools typically requires subsequent accurate adjustments, as by shimming or the like, to relocate the sharpened surface or table of the cutting bit in its critical location relative to the tool holder if the tool is to cut properly.

SUMMARY OF THE INVENTION

The present invention provides a cutting tool construction, especially advantageous for diamond-tip or similar type cutting tools, that is readily adapted to simplified manufacturing techniques and that overcomes the need for removing the cutting tip or bit from its supporting element or insert for sharpening and that avoids the need for adjusting the table after sharpening. The present invention thereby provides an economical cutting tool that can be readily sharpened or reground in a minimum of time, reused with a minimum of inconvenience, and that minimizes the damage or deterioration to the bit or tip that occurs from the application of heat, to which the tip or bit is subjected each time it is mounted or demounted during initial manufacture or a resharpening operation.

The above features and others are provided through the use of a tool holder having a locating surface that defines a plane in which the cutting edge of the tool is to be located, and a separable tool insert with a lapped positioning surface that contains the cutting edge and is clamped against the locating surface. As a consequence, in either the initial manufacture of a tool or in the resharpening of a tool, the insert can be ground and/or lapped along the positioning surface to sharpen or resharpen the cutting edge. Where the insert has a tip or bit of diamond or other hard substance, the tip or bit is sharpened without removal from the insert, because the table of the tip or bit is located in the plane of the positioning surface and is lapped concurrently with the positioning surface and to the same extent. When the insert is repositioned within the tool holder, with the positioning surface against the locating surface, the cutting edge of the tip or bit is automatically positioned in the plane of the locating surface of the holder, as desired.

It will be apparent that the construction of the present invention eliminates process steps in the manufacture or sharpening of the tool that subject the cutting tip or bit to extreme heat. It also eliminates the need for adjusting the insert to relocate the table after sharpening, and thus the new plane of the cutting edge is automatically repositioned in the plane of the previous cutting edge, as determined by the locating surface of the holder, to assure proper functioning. Longitudinal adjustment of the insert relative to the holder is afforded by an elongated slot in the insert, through which the clamping screw extends.

The present invention further provides a construction that minimizes or eliminates vibration of the tool insert by providing large surface area contact between the insert and the holder. This is accomplished with a three sided recess extending longitudinally of the holder, in which the insert is closely and substantially completely received. The recess and locating surface may extend at a single or compound angle relative to the longitudinal extent of the holder, to position the insert and the cutting surface at the desired predetermined position for the particular use or machine. The insert is secured in the recess by a screw, which extends through an elongated slot of the insert and is threaded into the holder in a position that clamps the tool insert against the locating surface. To assure retention of the tool insert within the holder, the two parts are constructed so that the locating surface of the holder and the positioning surface of the insert are in mutual contact only at spaced locations on diametrically opposite sides of the screw that clamps the insert against the holder. This is most conveniently achieved by relieving the shank of the insert behind the tip or bit at the cutting end and for a distance along the insert beyond the location of the clamping screw. As a result, when the screw is tightened to clamp the insert against the holder, a tight seal is assured between the holder and insert adjacent the tip to prevent entry of foreign matter. Also, a lock-washer effect is produced upon the screw to resist loosening from vibration.

A preferred embodiment of this invention, having a diamond tip, facilitates the following simplified methods of manufacture and maintenance: an uncut diamond is set in a cavity of the tool insert, in a matrix under a controlled atmosphere, and rough grinding, finish grinding, and polishing of the cutting surfaces are performed, all with the initial setting of the diamond. The insert is then secured against the locating surface of the tool holder in the manner already described. The cutting tip or bit has been subjected only to the initial heat of the original setting. After use, the cutting tool can be sharpened by removing the insert from the slot of the holder, and the diamond tip or bit is reground while secured to the insert. This eliminates any need to break the original brazing matrix to remove the tip or bit, and eliminates any need to rebraze the tip or bit to another holder.

A cutting tool constructed in the above manner has the following additional advantages: the position of the table of the diamond or other cutting tip remains constant, notwithstanding sharpening, which eliminates costly set up time and increases the available production time of the applicable machine; the permanent setting of the tip or bit in the matrix eliminates the need for solder, epoxy, or other adhesive material capable of removably securing the tip; the same insert or shank can be used repeatedly as the tip or bit is sharpened, resulting in considerable tool savings; and the insert can be repositioned in the holder to locate the tip the same axial distance from the holder as before.

The value of this construction can be further appreciated by considering that every tool of this type is normally relapped or reground from three to eight times. Each time, the cutting tool is subjected to at least two operations involving substantial heat from brazing torches or the like to remove and reset the tip or bit. The extensive time required and the damage inherently involved in such operations is eliminated after the original setting of the tip or bit in the present invention, and results in a very substantial cost reduction.

From the foregoing, it will be apparent that a principal object of this invention is to provide a cutting tool with a separable insert that facilitates the manufacture and sharpening of the tool without removing a cutting tip or bit from an insert shank, and in which the insert is automatically positioned in the holder, with the table in a predetermined position relative to the holder and securely retained during use. Other objects, features and advantages of this invention will become more apparent from the detailed description of preferred embodiments, which follows, when considered in connection with the accompanying drawings.

DETAILED DESCRIPTION OF PREFERRED EMBODIMENTS

Figure 1:
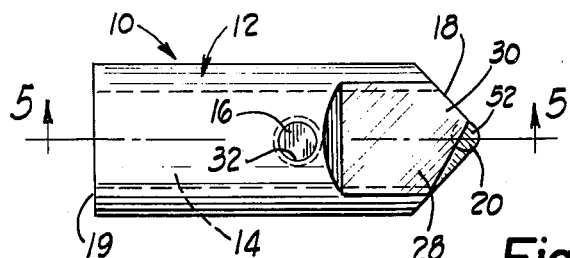
FIG. 1 is a top plan view of a cutting tool embodying the present invention.

A cutting tool 10 embodying the present invention is shown in FIGS. 1 to 5 of the drawing and is comprised of a tool holder 12, an insert 14 and a screw 16 for removably securing the holder and insert together. In assembled form, the insert 14 extends from one end 18 of the holder 12, exposing a cutting edge 20, and is approximately flush with an opposite end 19.

Figure 3:
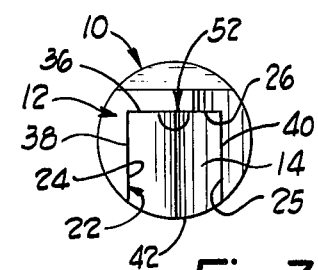
FIG. 3 is an end view of the cutting tool of FIG. 1, taken from the right hand side in the orientation of FIG. 1.

The holder 12 has a recess 22 for receiving, partially enclosing, and positioning the insert 14 with the cutting edge 20 in a predetermined location relative to the holder. In one preferred embodiment shown, the external surface of the holder is cylindrical. The recess 22 extends longitudinally or axially of the holder the full length and is open at opposite ends of the holder, so that the holder is generally U shape in cross-section, as best shown in FIG. 3. The recess has two side surfaces 24, 25, spaced laterally apart, flat and parallel in the embodiment shown, and has a flat locating surface 26, between the side surfaces 24, 25, and perpendicular thereto in the embodiment shown. The locating surface 26 is parallel to the axis of the holder in the preferred embodiment, but can be oriented otherwise if desired, for example, to locate the cutting edge differently. The front end 18 of the holder 12 includes a flat external surface portion 28 that terminates in a generally V shaped point 30, behind and offset slightly from the cutting edge 20, which acts as a chip breaker. This may be plated with hard chrome to deter cratering by metal chips in use. A threaded aperture 32 opens through the holder, extending in a direction transversely of the holder axis, through and perpendicular to the locating surface 26.

Figure 2:
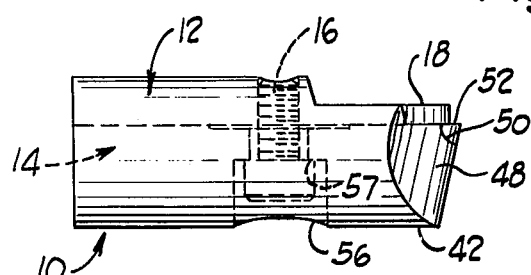
FIG. 2 is a side elevational view of the cutting tool of FIG. 1.
Figure 4:
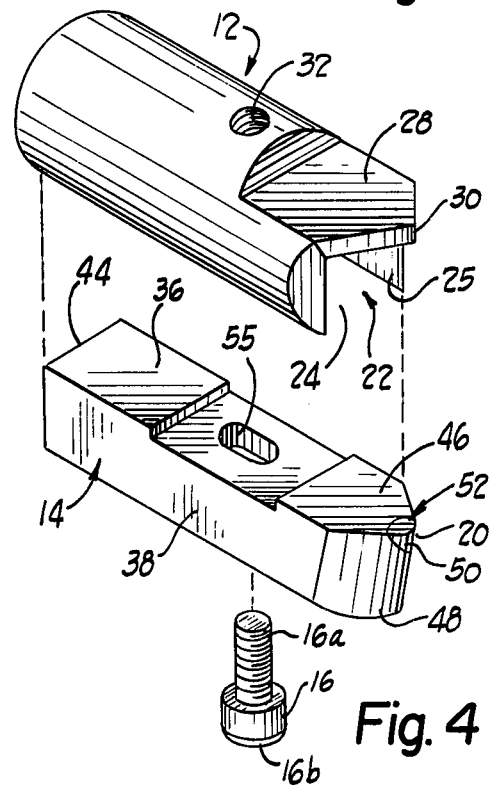
FIG. 4 is an exploded view of the cutting tool of FIG. 1.

The insert 14 has an elongated body, slightly longer than the holder 12, as best shown in FIGS. 1 and 2. In cross-section, the insert is of shape and size compatible with the recess 22 so that it will be received closely therein. Thus, it is generally rectangular in cross-sectional shape, but has a curved or cylindrical outer contour on one side similar to that of the holder. More specifically, the insert 14 has a generally flat positioning surface 36 and opposite side surfaces 38, 40 perpendicular to the positioning surface, and a lower surface 42 of cylindrical contour. The positioning surface 36 fits flush against the locating surface 26 of the holder, and the two side surfaces 38, 40 are directly adjacent to the side surfaces 24, 25 of the holder, the insert being received within the recess with a very close clearance fit. A back end surface 44 of the insert 14 is perpendicular to the two sides 38, 40 and the positioning surface 36. When assembled, a major portion of the insert is received within the recess 22 and the back surface 44 is located approximately flush with the back end 19 of the holder 12.

Figure 5:
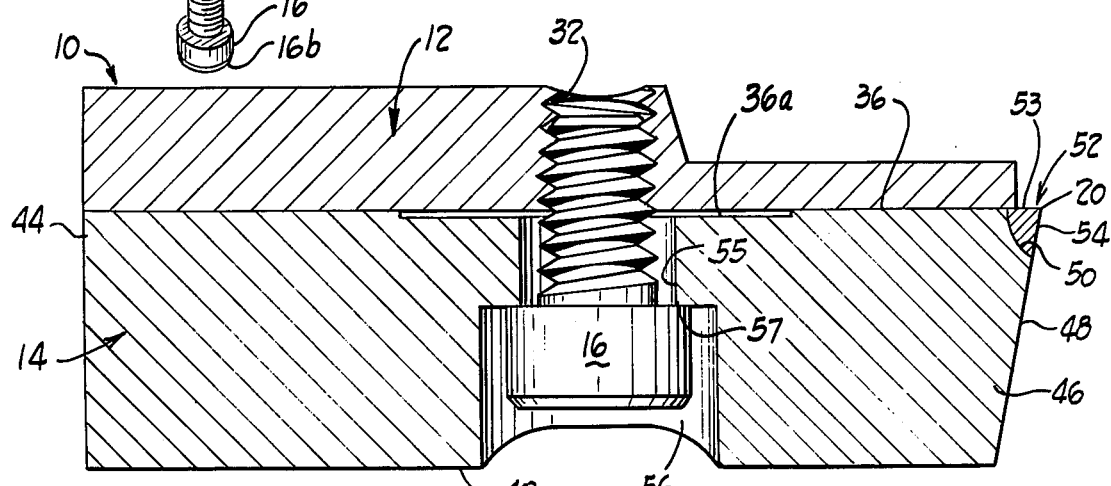
FIG. 5 is an enlarged longitudinal sectional view of the cutting tool of FIG. 1, taken along the line 5—5.

A front end 46 of the insert has a V-shaped front surface 48 relieved downwardly and rearwardly, as best shown in FIGS. 2 and 5. A cavity 50 formed in the upper and front surface of the insert receives a diamond 52 or other tip material, such as ceramic, tungsten carbide, or the like. The table or top surface 53 of the tip 52 is flush with the top, positioning, surface 36 at the front portion 46 of the insert. The cutting edge 20 of the insert is formed at the front edge of the tip 52 and is a generally rounded V-shape in the embodiment shown, but may be of other desired shape. A front surface 54 of the tip has a downward and rearward relief, the same as the surface 48.

An unthreaded aperture 55 extends through the insert 14, perpendicular to the surface 36. The aperture 55 is elongated in a direction parallel to the side surfaces 38, 40 so the location of the insert can be varied slightly along the recess 22. A counterbored recess 56 is formed in the lower surface 42 of the insert. The aperture 55 receives the threaded shank 16a of the screw 16 with clearance in the longitudinal direction of the holder, and the counterbored recess 56 receives the head 16b of the screw, also with clearance. The head 16a abuts an annular shoulder 57 at the base of the counterbored recess 55 and serves to clamp the insert against the locating surface 26 of the holder, when the screw is threaded into the threaded aperture 32 of the holder.

The positioning surface 26 of the insert is constructed to provide a locking or lock-washer effect when the insert is clamped against the locating surface with the screw 16. For this purpose, the positioning surface 36 includes a recessed portion 36a, best shown in FIG. 5, located between the ends 44, 46 and extending longitudinally on opposite sides of the aperture 55 and completely across the insert. In the preferred embodiment shown, the recessed portion 36a is of uniform depth along its length and width. When the insert 14 is clamped against the locating surface 26 by the screw 16, the insert contacts the locating surface along the surface 36 at opposite ends of the recess and the insert distorts slightly so as to apply and maintain tension upon the clamping screw 16, thereby locking the screw against rotation from vibration during use. This also effects a tight seal at the front end of the insert to prevent cutting fluid or other matter from getting between the holder and insert at the locating surface.

In manufacture, the tip 52, such as a diamond, is permanently set in the insert 14, eliminating the need for securing the insert with solder, epoxy, or other adhesive that permits removal. The permanently set tip is rough and finished ground, and polished, in the initial setting in the insert. The top surface 36 of the insert is ground and polished along with the table or flat top surface 53 of the tip 52.

In use, then, the locating surface 26 of the holder will automatically locate the table of the tip in the plane of the locating surface, once the top surface 36 of the insert is flush against the locating surface 26. The insert is located in axial relationship to the holder by the screw 16. The insert is clamped securely in place by the screw and locked by the flexing of the insert permitted by the recessed surface portion 36a. The cylindrical outer surface 42 of the insert forms a continuation of the cylindrical surface of the holder so that the holder and insert can be readily received and positioned in a standard tool holder. The side surfaces 24, 25 of the holder, by virtue of their substantial area and close relationship to the side surfaces 38, 40 of the insert, inhibit vibration of the insert relative to the holder during a cutting operation. This is extremely important for optimum cutting performance.

When it is necessary to resharpen the cutting edge 20 of the tip 52, the insert 14 is removed from the holder 12, by removing the screw 16. The positioning surface 36 is then ground and lapped, along with the table 53 of the tip 52. If necessary, the front surface is also ground and lapped. The insert is then replaced, with the surface 36 flush against the locating surface 26. This again locates the table 53 (as newly formed) in the plane of the surface 26, assuring that the resharpened cutting edge is located in the same position relative to the holder as previously. If the front surface of the tip 52 has been ground and lapped, longitudinal adjustment of the insert is made with respect to the holder via the elongated slot 32 so the tip is located in the same relationship to the holder as before. This assures that the position of the holder in the machine tool need not be modified after sharpening. Thus, the tip 52 is resharpened without removal from the insert 14 and the position of the tip remains essentially constant relative to the holder throughout successive sharpening operations. When it is considered that tools of this type are normally re-lapped or reground from three to eight times, and in each instance the cutting tool is subjected to at least two operations involving the heat of brazing torches or electric heating devices, it can be appreciated that the present construction provides a significant advantage in eliminating the use of heat after the original setting of the tip in the holder 14. It will also be appreciated that relapping of the positioning surface 36 along with the tip 52 and the positioning of the cutting edge 20 of the tip 52 by locating the lapped surface against a reference plane of the holder, completely eliminates any need for adjustment of the table plane after grinding or lapping.

Figure 6:
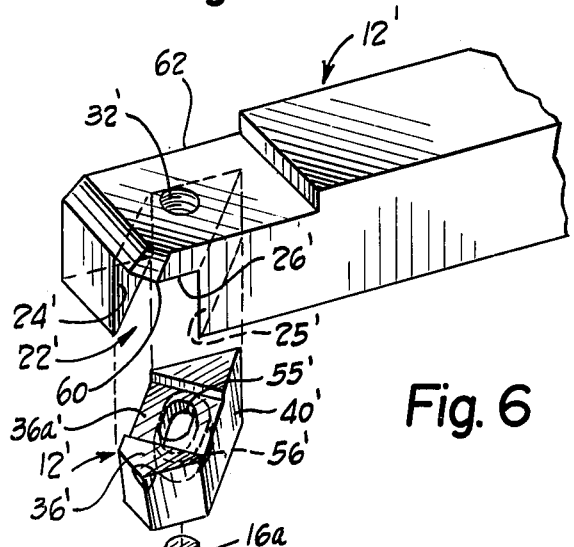
FIG. 6 is an exploded view of a cutting tool of modified construction from that shown in FIGS. 1-5, embodying the present invention.

Another embodiment of the invention is shown in FIG. 6 of the drawing, in which analogous parts to those of the embodiment of FIGS. 1–5 will be designated by like reference numerals, but denoted by a prime.

A holder 12' has a recess 22' with parallel flat side surfaces 24', 25' at an angle to the longitudinal extent of the holder. A flat locating surface 26' extends between the side surfaces. The recess opens through one front corner portion 60 and through an opposite side portion 62.

An insert 14' has an elongated body slightly longer than the recess 22' and shaped to extend from the corner portion 60 and be essentially flush with the side 62. Two opposite sides 38', 40' of the insert are parallel to the sides 24', 25' of the recess and the insert is received closely within the recess 22'. A flat positioning surface 36' of the insert fits against the locating surface 26' and has a recess 36a' at a central part. An oval aperture 55' extends through the insert and has a counterbore 56'. A screw 16 is received in the aperture 55' and engages with threads in an aligned aperture 32' of the holder to clamp the insert into the holder, against the locating surface 26'.

While preferred embodiments of the present invention have been described in detail, it will be appreciated that various modifications or alterations may be made therein, without departing from spirit and scope of the invention set forth in the appended claims.

What is claimed is:

1. A cutting tool comprising, in combination, a holder, a separable insert securable to said holder and having a cutting edge, and means for securing said insert to said holder; said holder having a locating surface for locating the tool insert, and said tool insert having a planar positioning surface that seats against said locating surface, a cutting edge in the plane of said positioning surface, and a bit or tip integral with said insert, forming said cutting edge; said locating surface of the holder and said positioning surface of the insert being in mutual contact only at locations on opposite sides of said means for securing the insert to the holder and separated by an area across the insert free from mutual contact, said holder having a threaded aperture opening through said locating surface, and said insert having a through-aperture spaced from said cutting edge, opening through said positioning surface, and sufficiently larger than said securing means in a direction extending toward the cutting edge to permit adjustment of the insert in that direction; and said means for securing the insert to the holder being a threaded fastener constructed to extend through said insert aperture, engage said threaded aperture, and clamp said insert against said locating surface.

2. A cutting tool comprising, in combination, a tool holder and a removable insert for said holder, both elongated; said tool holder having a longitudinally extending recess for receiving a major portion of said insert and said recess having three longitudinal surfaces adjacent to surfaces of said insert, one of said recess surfaces being a locating surface defining a reference plane for the insert; said insert having surface portions that lie in a common plane and are positioned against said locating surface, a tip or bit of hard material bonded to one end of said insert, and a cutting edge on the tip or bit in the plane of said surface portions that are positioned against the locating surface; and means for securing said insert in said recess against said locating surface, said means being located intermediate ends of said insert and providing longitudinal adjustment of the insert relative to the holder; and said surface portions of the insert including two portions along the insert separated by a recess and located on opposite sides of said securing means.

3. A cutting tool comprising a tool holder having a locating surface and two spaced surfaces transverse to the locating surface together defining an elongated recess in the holder, a removable insert received in said recess adjustable longitudinally of said recess, a positioning surface on said insert extending longitudinally of the insert and seated against the locating surface, an aperture through the insert intermediate its ends, opening through said positioning surface and elongated in the longitudinal direction of the insert, a recess in the positioning surface extending across the width of the insert and longitudinally for at least the length of the aperture, a fixed cutting tip at one end of the insert with a surface forming a continuation of said positioning surface, a cutting edge formed by an edge of said surface of the cutting tip, and a screw extending through said insert and received in threaded engagement with said holder for securing the insert in said recess, clamped against the locating surface, said screw having a portion extending through said aperture smaller in said longitudinal direction than the aperture to permit longitudinal adjustment of the insert relative to the holder.

* * * * *